(12) United States Patent
Hayami et al.

(10) Patent No.: US 11,975,731 B2
(45) Date of Patent: May 7, 2024

(54) DRIVING ASSISTANCE SYSTEM, DRIVING ASSISTANCE METHOD, AND PROGRAM

(71) Applicant: MURAKAMI CORPORATION, Shizuoka (JP)

(72) Inventors: Atsushi Hayami, Shizuoka (JP); Masao Makita, Shizuoka (JP); Takayoshi Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 360 days.

(21) Appl. No.: 17/608,293

(22) PCT Filed: May 22, 2020

(86) PCT No.: PCT/JP2020/020278
§ 371 (c)(1),
(2) Date: Nov. 2, 2021

(87) PCT Pub. No.: WO2020/241485
PCT Pub. Date: Dec. 3, 2020

(65) Prior Publication Data
US 2022/0161814 A1 May 26, 2022

(30) Foreign Application Priority Data
May 31, 2019 (JP) .................................. 2019-102550

(51) Int. Cl.
*H04N 5/44* (2011.01)
*B60W 30/095* (2012.01)
(Continued)

(52) U.S. Cl.
CPC ........ *B60W 50/14* (2013.01); *B60W 30/0956* (2013.01); *G06V 20/58* (2022.01);
(Continued)

(58) Field of Classification Search
CPC ............ B60W 50/14; B60W 30/0956; B60W 2050/143; B60W 2050/146;
(Continued)

(56) References Cited

U.S. PATENT DOCUMENTS

| 7,570,155 B2* | 8/2009 | Horii ................ G08B 13/19697 340/988 |
| 2001/0013835 A1* | 8/2001 | Hsu .......................... B60Q 1/52 356/3 |

(Continued)

FOREIGN PATENT DOCUMENTS

| JP | 2003-025937 | 1/2003 |
| JP | 2009-023565 | 2/2009 |

(Continued)

OTHER PUBLICATIONS

International Search Report (ISR) from International Searching Authority (Japan Patent Office) in International Pat. Appl. No. PCT/JP2020/020278, dated Aug. 11, 2020, together with an English language translation.

*Primary Examiner* — Munear T Akki
(74) *Attorney, Agent, or Firm* — Greenblum & Bernstein, P.L.C.

(57) ABSTRACT

Warning information that facilitates grasping an obstacle located in rear of a vehicle is provided. A driving assistance system including: a first detection section that detects an obstacle from a plurality of captured images of a rear side of a driver of a vehicle; a second detection section that detects the obstacle by analyzing a reflected wave of a measurement wave transmitted to the rear side; and an information output section that determines a direction in which the obstacle is located with respect to the vehicle on the basis of detection results of the first detection section and the second detection section, and that outputs warning information indicating the direction.

6 Claims, 8 Drawing Sheets

(51) Int. Cl.
    *B60W 50/14*         (2020.01)
    *G06V 20/58*         (2022.01)

(52) U.S. Cl.
    CPC . *B60W 2050/143* (2013.01); *B60W 2050/146* (2013.01); *B60W 2420/42* (2013.01); *B60W 2420/52* (2013.01); *B60W 2420/54* (2013.01)

(58) Field of Classification Search
    CPC ......... B60W 2420/42; B60W 2420/52; B60W 2420/54; G06V 20/58
    See application file for complete search history.

(56) References Cited

U.S. PATENT DOCUMENTS

| | | | | |
|---|---|---|---|---|
| 2005/0075770 | A1* | 4/2005 | Taylor | G08G 1/161 701/1 |
| 2005/0134441 | A1* | 6/2005 | Somuah | B60Q 1/50 340/435 |
| 2006/0167595 | A1* | 7/2006 | Breed | B60R 21/0152 701/1 |
| 2007/0109104 | A1* | 5/2007 | Altan | B60Q 9/008 340/407.1 |
| 2010/0066534 | A1* | 3/2010 | Takeichi | G01S 7/527 340/540 |
| 2012/0310547 | A1* | 12/2012 | Cristoforo | G01N 33/004 702/24 |
| 2014/0168435 | A1* | 6/2014 | Tuhro | B60Q 1/48 348/148 |
| 2014/0207344 | A1* | 7/2014 | Ihlenburg | E05F 15/73 701/49 |
| 2015/0070156 | A1* | 3/2015 | Milburn, Jr. | B60Q 9/008 340/435 |
| 2015/0073664 | A1* | 3/2015 | Petridis | B60W 30/095 701/41 |
| 2017/0323566 | A1 | 11/2017 | Suto | |
| 2018/0304811 | A1 | 10/2018 | Seki et al. | |
| 2020/0101968 | A1* | 4/2020 | Kim | B60W 30/0956 |

FOREIGN PATENT DOCUMENTS

| | | |
|---|---|---|
| JP | 2009-075988 | 4/2009 |
| JP | 2010-093610 | 4/2010 |
| JP | 2017-016200 | 1/2017 |
| JP | 2017-203638 | 11/2017 |
| JP | 2018-181168 | 11/2018 |

* cited by examiner

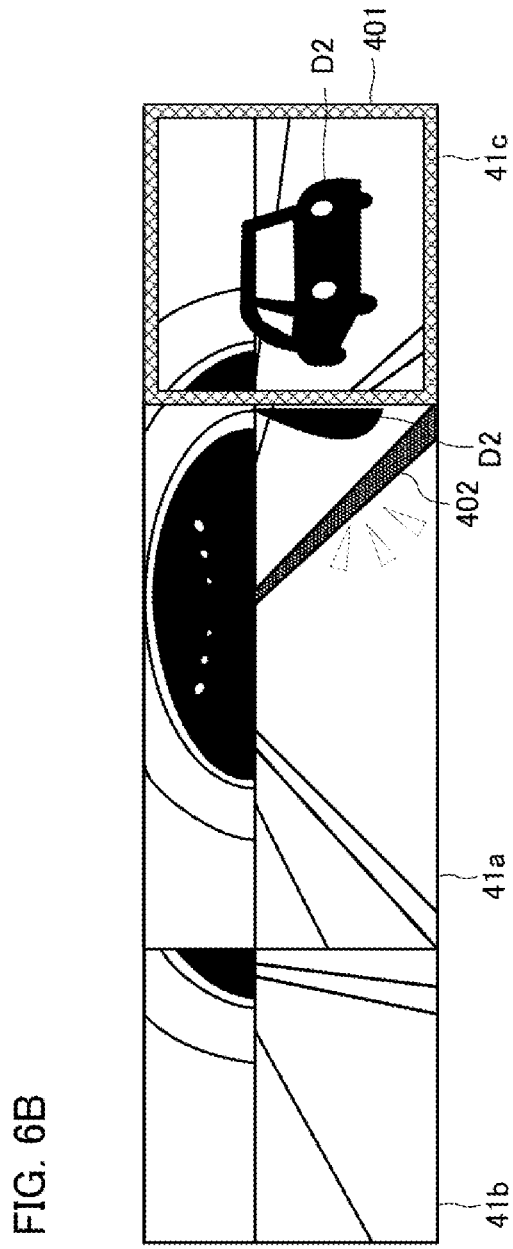

DRIVING ASSISTANCE SYSTEM, DRIVING ASSISTANCE METHOD, AND PROGRAM

TECHNICAL FIELD

The present invention relates to a driving assistance system, a driving assistance method, and a program.

BACKGROUND ART

Conventionally, there has been known a technique for detecting an image of a pedestrian from a captured image of a front of a vehicle, superimposing the detected image on the captured image, and displaying a resultant image so that a driver who is driving the vehicle can easily grasp the presence of the pedestrian (refer to, for example, Patent Literature 1). As for a rear of the vehicle in addition to the front of the vehicle, there has been similarly known a technique for detecting a moving object from a captured image of the rear of the vehicle and displaying the captured image of the rear of the vehicle in which the moving object is demarcated by a border (refer to, for example, Patent Literature 2).

CITATION LIST

Patent Literature

Patent Literature 1: JP 2010-93610 A
Patent Literature 2: JP 2009-23565 A

SUMMARY OF INVENTION

Technical Problem

The captured image of the rear of the vehicle is displayed when the driver looks at a rearview mirror, the captured image is switched over to a captured image of a right rear side of the vehicle when the driver looks at a right side mirror, and the captured image is switched over to a captured image of a left rear side of the vehicle when the driver looks at a left side mirror. That is, without moving a line of sight, the driver is unable to obtain a field of view from each mirror and to notice the moving object in the captured image of any of the mirrors that the driver is not looking at. Furthermore, in a case where the driver is not aware of which mirror the driver has looked at, it is difficult to grasp, from the captured image, in which direction the moving object in the captured image is located on a rear side of the vehicle.

An object of the present invention is to provide warning information that facilitates grasping an obstacle located in rear of a vehicle.

Solution to Problem

The invention set forth in a first embodiment is a driving assistance system including:
a first detection section that detects an obstacle from a plurality of captured images of a rear side of a driver of a vehicle;
a second detection section that detects an obstacle by analyzing a reflected wave of a measurement wave transmitted to the rear side; and
an information output section that determines a direction in which the obstacle is located with respect to the vehicle on the basis of detection results of the first detection section and the second detection section, and that outputs warning information indicating the direction.

According to the invention set forth in the first embodiment, the obstacle located on the rear side is detected not only from the plurality of captured images of the rear side of the vehicle but also from a measurement result using the measurement wave. Therefore, it is possible to detect not only an obstacle at a short detection distance but also an obstacle at a long detection distance, and warn the driver of the obstacles. Furthermore, the warning information indicating the direction in which the obstacle is located is output on the basis of the detection results. Therefore, it is possible to provide the warning information that facilitates grasping the direction in which the obstacle is located in the rear of the vehicle difficult for the driver to visually recognize during driving. Therefore, it is possible to avoid a collision with an obstacle and assist safety driving.

The invention set forth in a second embodiment is the driving assistance system according to the first embodiment, wherein
the information output section determines a degree of risk of the obstacle on the basis of each of the detection results, and generates the warning information when the degree of risk exceeds a threshold.

According to the invention set forth in the second embodiment, it is possible to provide the warning information in a case where the degree of risk is high to exceed the threshold, and to reduce provision of unnecessary warning information.

The invention set forth in a third embodiment is the driving assistance system according to the second embodiment, including
a third detection section that detects traffic lanes around the vehicle from the captured image, wherein
the information output section determines the degree of risk on the basis of each detection result of the obstacle and a detection result of the traffic lanes.

According to the invention set forth in the third embodiment, it is possible to determine the degree of risk by a positional relationship between the obstacle and each traffic lane, and to warn of a possibility of deviation from a traveling lane, a collision at a time of a traffic lane change, and the like.

The invention set forth in a fourth embodiment is the driving assistance system according to the second or third embodiment, wherein
the information output section acquires driving information about the vehicle, and determines the degree of risk on the basis of each of the detection results and the driving information.

According to the invention set forth in the fourth embodiment, it is possible to determine the degree of risk depending on the obstacle and a driving situation of the vehicle, and to warn of possibilities of a collision when the vehicle turns left, a rear-end collision from behind, and the like.

The invention set forth in a fifth embodiment is the driving assistance system according to the second to fourth embodiments, wherein
the information output section determines an output mode of the warning information depending on the degree of risk.

According to the invention set forth in the fifth embodiment, the driver can easily grasp the degree of risk from a difference in the output mode.

The invention set forth in a sixth embodiment is the driving assistance system according to any one of the first to fifth embodiments, wherein the plurality of captured images contain captured images in a plurality of directions of the rear side, and the information output section generates one display image by arranging the captured images in each of the directions, superimposes the warning information indicating the direction in which the obstacle is located on the captured images in each of the directions, and outputs the one display image to a display section of the vehicle.

According to the invention set forth in the sixth embodiment, the driver can grasp a situation of the rear side at a glance. Furthermore, the driver can easily grasp the direction in which the obstacle is located on the rear side.

The invention set forth in a seventh embodiment is a driving assistance method executed by a driving assistance system, the driving assistance method including:

detecting an obstacle from a plurality of captured images of a rear side of a driver of a vehicle;

detecting an obstacle by analyzing a reflected wave of a measurement wave transmitted to the rear side; and determining a direction in which the obstacle is located with respect to the vehicle on the basis of detection results about the obstacle, and outputting warning information indicating the direction.

According to the invention set forth in the seventh embodiment, the obstacle located on the rear side is detected not only from the plurality of captured images of the rear side of the vehicle but also from a measurement result using the measurement wave. Therefore, it is possible to detect not only an obstacle at a short detection distance but also an obstacle at a long detection distance, and warn the driver of the obstacles. Furthermore, the warning information indicating the direction in which the obstacle is located is output on the basis of the detection results. Therefore, it is possible to provide the warning information that facilitates grasping the direction in which the obstacle is located in the rear of the vehicle difficult for the driver to visually recognize during driving. Therefore, it is possible to avoid a collision with an obstacle and assist safety driving.

The invention set forth in an eighth embodiment is a program for causing a computer to execute:

detecting an obstacle from a plurality of captured images of a rear side of a driver of a vehicle;

detecting an obstacle by analyzing a reflected wave of a measurement wave transmitted to the rear side; and determining a direction in which the obstacle is located with respect to the vehicle on the basis of detection results about the obstacle, and outputting warning information indicating the direction.

According to the invention set forth in the eighth embodiment, the obstacle located on the rear side is detected not only from the plurality of captured images of the rear side of the vehicle but also from a measurement result using the measurement wave. Therefore, it is possible to detect not only an obstacle at a short detection distance but also an obstacle at a long detection distance, and warn the driver of the obstacles. Furthermore, the warning information indicating the direction in which the obstacle is located is output on the basis of the detection results. Therefore, it is possible to provide the warning information that facilitates grasping the direction in which the obstacle is located in the rear of the vehicle difficult for the driver to visually recognize during driving. Therefore, it is possible to avoid a collision with an obstacle and assist safety driving.

Advantageous Effects of Invention

According to the present invention, it is possible to provide warning information that facilitates grasping an obstacle located in rear of a vehicle.

BRIEF DESCRIPTION OF DRAWINGS

FIG. 6B is a view illustrating an example of a display screen in a case where warning information is output.

DESCRIPTION OF EMBODIMENTS

Embodiments of a driving assistance system, a driving assistance method, and a program according to the present invention will be described hereinafter with reference to the drawings.

Figure 1:
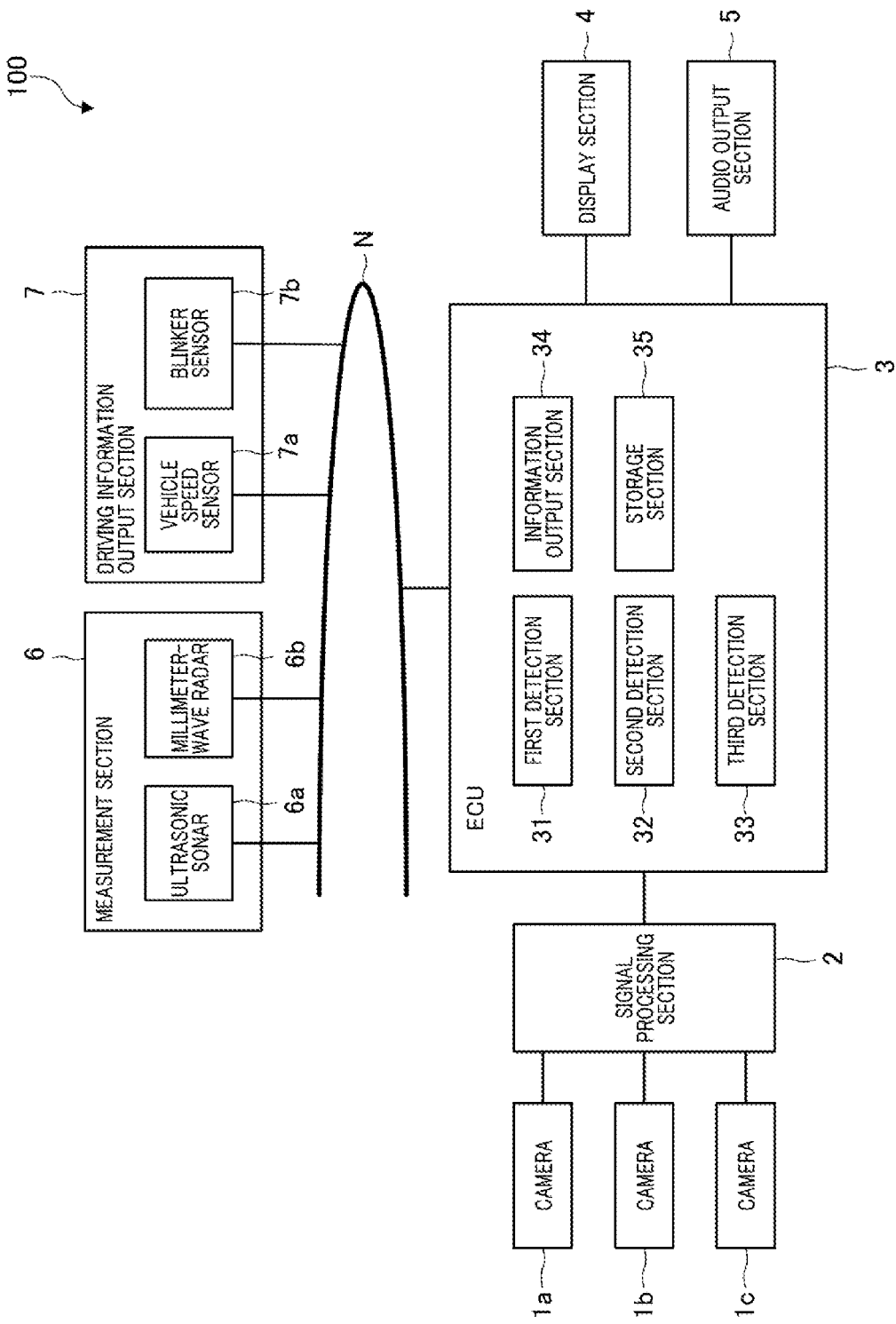
FIG. 1 is a block diagram illustrating an example of configurations of a driving assistance system in the present embodiment.

FIG. 1 illustrates an example of configurations of a driving assistance system 100 according to an embodiment of the present invention.

The driving assistance system 100 according to the present embodiment is mounted in a vehicle and assists a driver of the vehicle in driving by providing information to the driver.

As illustrated in FIG. 1, the driving assistance system 100 includes three cameras 1a to 1c, a signal processing section 2, an electronic control unit (ECU) 3, a display section 4, and an audio output section 5. The driving assistance system 100 also includes a measurement section 6 and a driving information output section 7. The measurement section 6 and the driving information output section 7 are connected to the ECU 3 via a network N such as a controller area network (CAN).

The cameras 1a to 1c continuously capture images of a rear side of the driver and sequentially generate time-series captured images. The cameras 1a to 1c are provided at positions including, for example, a position near a license plate and positions of left and right side mirrors. The captured images are subjected to signal processing by the signal processing section 2 and then output to the ECU 3.

(ECU)

The ECU 3 detects an obstacle such as another vehicle or a pedestrian located on a rear side of the driver, generates warning information against the detected obstacle, and outputs the warning information to the display section 4 or the audio output section 5.

The ECU 3 includes a first detection section 31, a second detection section 32, a third detection section 33, an information output section 34, and a storage section 35.

The first detection section 31 detects an obstacle from each of the captured images generated by the cameras 1a to 1c.

The second detection section 32 analyzes a reflected wave of a measurement wave transmitted to the rear side of the vehicle by the measurement section 6. The second detection section 32 detects an obstacle located on the rear side on the basis of an analysis result.

The third detection section 33 detects traffic lanes around the vehicle from each of the captured images generated by the cameras 1a to 1c.

The information output section 34 determines a direction in which the obstacle is located with respect to the vehicle on the basis of detection results of the first detection section 31 and the second detection section 32. The information output section 34 outputs warning information indicating the determined direction.

The storage section 35 can store the captured images generated by the cameras 1a to 1c, a measurement result of the measurement section 6, driving information output from the driving information output section 7, and the like. As the storage section 35, a storage medium such as a flash memory or an EEPROM can be used.

It is noted that functions of the first detection section 31, the second detection section 32, the third detection section 33, and the information output section 34 can be realized by processing performed by hardware such as IC chips, or can be realized by software processing in which a processor such as a CPU executes a program. In a case of realizing the functions by the software processing, the program can be stored in the storage section 35.

The display section 4 may be either an in-vehicle monitor having a general aspect ratio or a rearview mirror type monitor having a ratio at which a width is larger than a height. The display section 4 can display the captured images generated by the cameras 1a to 1c in accordance with an instruction from the ECU 3. Furthermore, the display section 4 can display a warning message, a warning mark, and the like on the basis of the warning information output from the ECU 3.

The audio output section 5 is a speaker or the like that outputs a sound in accordance with an instruction from the ECU 3. The audio output section 5 can output a warning sound on the basis of the warning information output from the ECU 3.

The measurement section 6 transmits a measurement wave such as a sound wave or a radio wave toward the rear side of the vehicle, receives a reflected wave of the measurement wave, and outputs the reflected wave to the ECU 3 as a measurement result of measuring the rear side. The driving assistance system 100 according to the present embodiment includes an ultrasonic sonar 6a and a millimeter-wave radar 6b as the measurement section 6. The ultrasonic sonar 6a transmits an ultrasonic wave and receives a reflected wave of the ultrasonic wave. The millimeter-wave radar 6b transmits a radio wave called a millimeter wave having a radio wave wavelength of approximately 1 to 10 mm (a frequency band of 30 to 300 GHz,) and receives a reflected wave of the radio wave. It is noted that a sensor using a measurement wave other than the ultrasonic wave and the millimeter wave may be provided as the measurement section 6.

The driving information output section 7 detects a driving state of the vehicle and outputs a detection result to the ECU 3 as driving information. The driving assistance system 100 according to the present embodiment includes a vehicle speed sensor 7a and a blinker sensor 7b as the driving information output section 7. The vehicle speed sensor 7a detects a rotation speed of an axle of the vehicle. The ECU 3 can obtain a traveling speed of the vehicle from the detected rotation speed of the axle. The blinker sensor 7b detects a driver's operation on a right or left blinker. The ECU 3 can detect a start of a traffic lane change of the vehicle from a detection result of the blinker sensor 7b. It is noted that other sensors such as a steering angle sensor or the like may be provided as the driving information output section 7 as long as the other sensor is capable of detecting the driving state.

Figure 2:
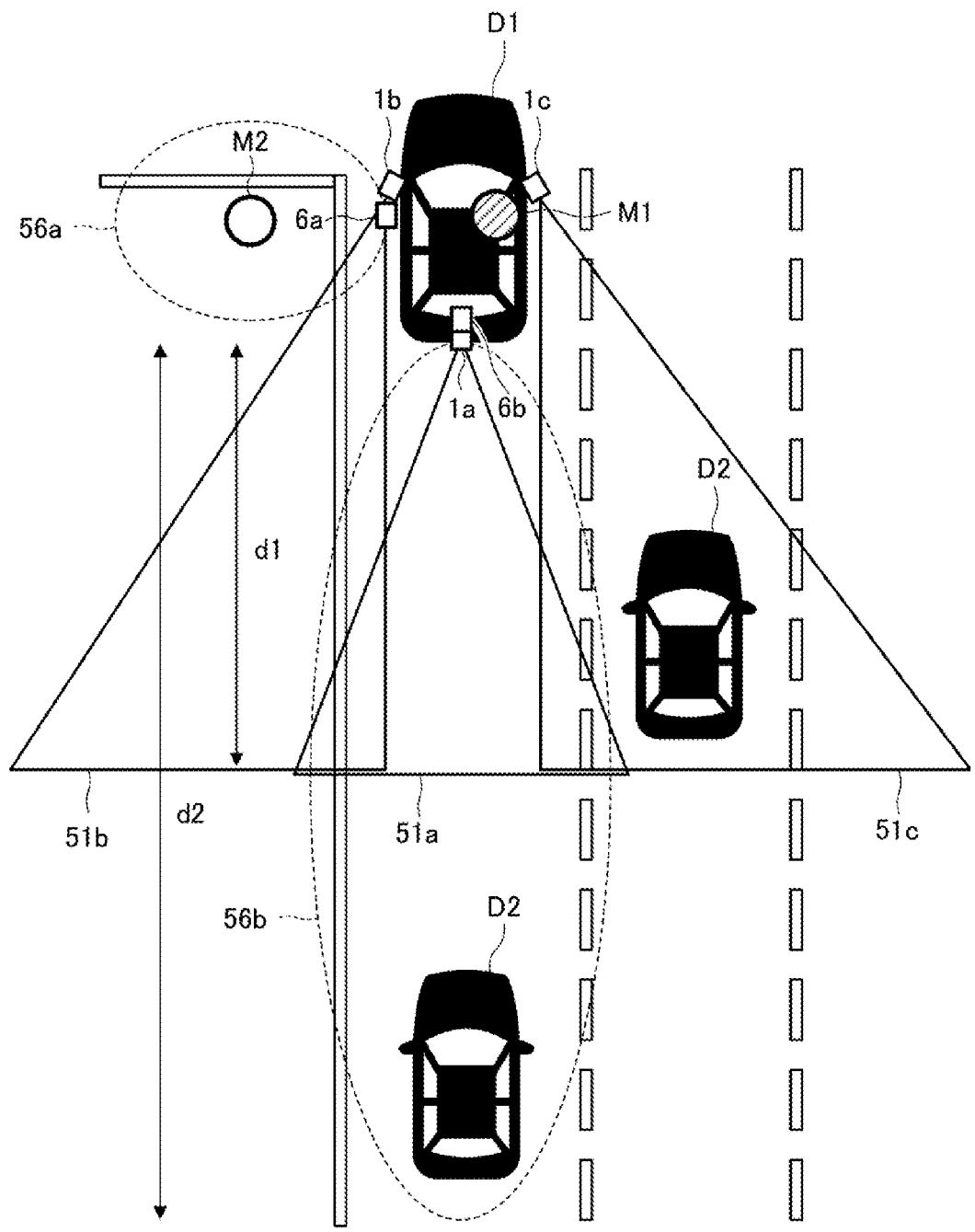
FIG. 2 is a diagram illustrating an example of detection ranges of cameras, an ultrasonic sonar, and a millimeter-wave radar.

FIG. 2 illustrates an example of obstacle detection ranges of the cameras 1a to 1c, the ultrasonic sonar 6a, and the millimeter-wave radar 6b.

As illustrated in FIG. 2, the camera 1a is provided near a rear license plate of a vehicle D1. A detection range 51a of the camera 1a is located in rear of the vehicle D1 similarly to a detection range of a rearview mirror, and has an angle of view equal to or greater than an angle of view of the rearview mirror. On the other hand, the cameras 1b and 1c are provided near the left and right side mirrors, respectively. Detection ranges 51b and 51c of the cameras 1b and 1c are located on a rear left side and a rear right side of a driver M1, respectively, and each have an angle of view equal to or greater than an angle of view of the left or right side mirror.

The ultrasonic sonar 6a is provided near the left side mirror. A detection range 56a of the ultrasonic sonar 6a is located in a range from a left side to the rear left side of the vehicle D1, which is a blind spot of the camera 1b. The detection range 56a enables detection of a pedestrian M2 located in the blind spot on the rear left side.

The millimeter-wave radar 6b is provided in rear of the vehicle D1 similarly to the camera 1a. A detection range 56b of the millimeter-wave radar 6b is located in rear of the vehicle D1 similarly to the detection range 51a of the camera 1a. However, a detectable distance d2 of the detection range 56b in rear of the vehicle D1 is larger than a distance d1 of the detection range 51a. It is, therefore, possible to detect an obstacle D2 located farther than the detection range 51a of the camera 1a. For example, the distance d1 is approximately 50 m, while the distance d2 is approximately 110 m.

It is noted that the obstacle detection ranges described above are given as an example and the present invention is not limited to the detection ranges. Positions, directions, angles of view, detection distances, and the like of the detection ranges can be arbitrarily determined depending on laws and regulations and a custom of a state where the vehicle travels, cases of accidents prone to occur in the state, and the like.

Figure 3:
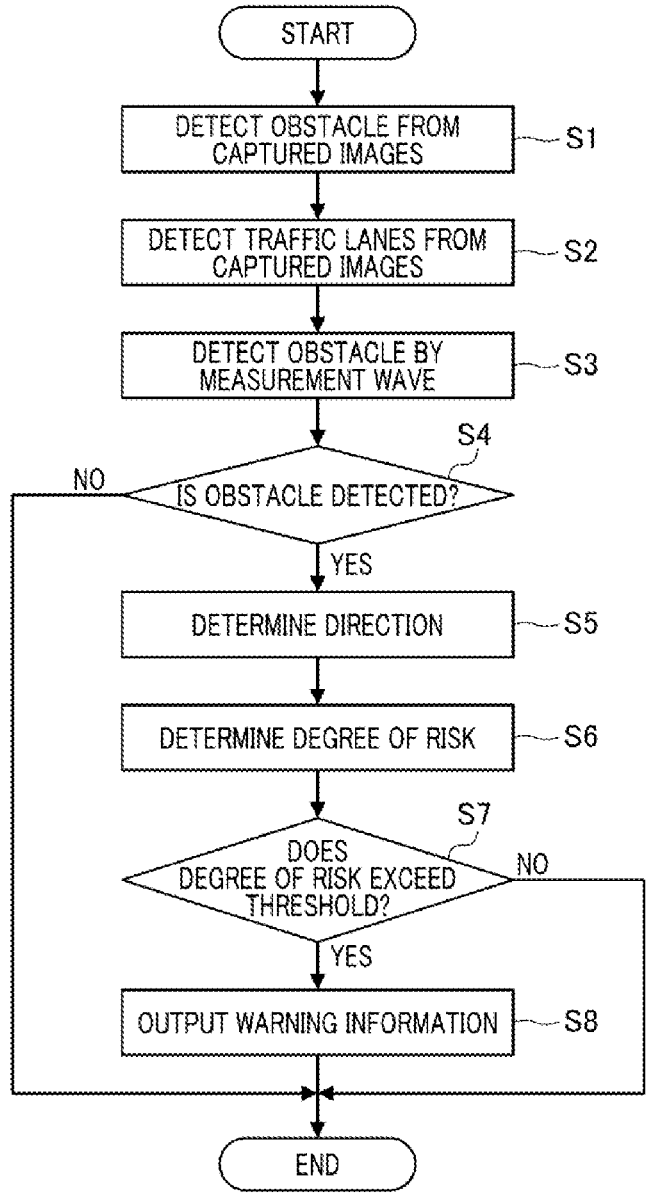
FIG. 3 is a flowchart of driving assistance processing.

FIG. 3 is a flowchart illustrating driving assistance processing executed by the ECU 3. This processing is repeatedly performed during driving.

As illustrated in FIG. 3, in the ECU 3, the first detection section 31 detects an obstacle from a plurality of captured images generated by the cameras 1a to 1c (Step S1). Examples of the obstacle as an object to be detected include a person, an animal, another vehicle, a guardrail, and a building. The first detection section 31 can obtain information related to the obstacle such as a classification of, for example, whether the obstacle is a vehicle or a person, a distance from the vehicle to the obstacle, and a relative speed of the obstacle with respect to the vehicle by analyzing the captured images.

While a detection method by the first detection section 31 is not limited to a specific one, a detection method using, for example, machine learning or artificial intelligence can be used. Detection can be performed using histograms of oriented gradients (HOGs) as the machine learning or using deep learning as the artificial intelligence. In a case of using the machine learning or the deep learning, the first detection section 31 learns features of an image of an object to be detected by using, as images for learning. Examples of the image include captured images that are obtained by capturing the object to be detected such as a vehicle or a person from various directions and that differ in vehicle type or perspective. The first detection section 31 then detects image regions that coincide with the features of the image of the object to be detected learned from the captured images, respectively.

Next, the third detection section 33 detects traffic lanes around the vehicle from each of the captured images (Step S2). For example, the third detection section 33 detects straight lines by Hough transformation after binarizing the captured images. Then, the third detection section 33 detects straight lines, for example, each toward a vanishing point from among the straight lines as the traffic lanes, or detects straight lines each detected at substantially the same position over a plurality of frames as the traffic lanes. It is noted that a traffic lane detection method is not limited to this method, and a publicly-known detection method can be used. For example, the third detection section 33 may detect traffic lanes by detecting a guardrail, a median strip, or the like without limiting to detection of road signs such as white lines or yellow lines that demarcates the traffic lanes.

The detection processing in Steps S1 and S2 is preferably performed on one composite image obtained by combining three captured images.

Figure 4:
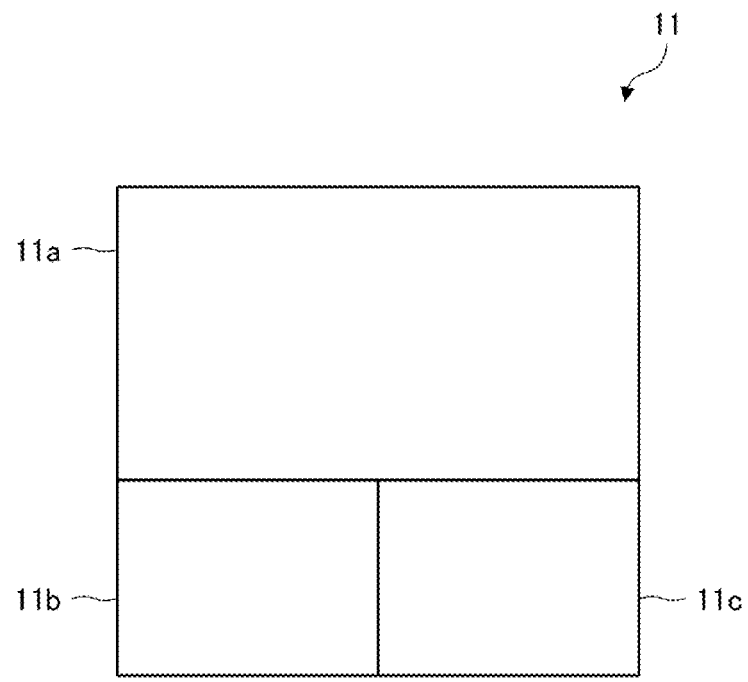
FIG. 4 is a diagram illustrating an example of a composite image.

FIG. 4 illustrates an example of a composite image 11 of three captured images 11a, 11b, and 11c.

Since one module can perform detection processing on one composite image 11, configurations can be made simple and a cost can be reduced in a case of one composite image, compared with a case where three modules perform processing on the three captured images 11a to 11c in parallel, respectively. Furthermore, processing time can be made short in the case of processing on the one composite image 11, compared with a case where one module performs processing on the three captured images 11a to 11c in order.

On the other hand, the second detection section 32 detects an obstacle by analyzing the measurement result of the measurement section 6 (Step S3). At this time, the second detection section 32 can obtain information related to the obstacle such as the distance from the vehicle to the obstacle, an azimuth and the relative speed of the obstacle with respect to the vehicle from the measurement result.

When no obstacle is detected by the first detection section 31 and the second detection section 32 (Step S4: NO), this processing is ended. When an obstacle is detected (Step S4: YES), the information output section 34 determines a direction in which the obstacle is located with respect to the vehicle on the basis of the detection results (Step S5).

The information output section 34 can determine the direction in which the obstacle is located depending on in which detection range the obstacle is detected. When the obstacle is detected by, for example, the captured image by the camera 1a or the measurement result of the millimeter-wave radar 6b, the information output section 34 can determine that the direction in which the obstacle is located is a direction of the detection range of the camera 1a or the millimeter-wave radar 6b, that is, a direction of the rear of the vehicle. Furthermore, when the obstacle is detected by the captured image by the camera 1b or the camera 1c, the information output section 34 can determine that the direction in which the obstacle is located is a direction of the rear left side of the vehicle that is in the detection range of the camera 1b or of the rear right side of the vehicle that is in the detection range of the camera 1c. When the obstacle is detected by the ultrasonic sonar 6a, the information output section 34 can determine that the direction in which the obstacle is located is a direction of the blind spot from the left side to the rear left side of the vehicle, which is the detection range of the ultrasonic sonar 6a.

Since the detection range 51a of the camera 1a partially overlaps the detection ranges 51b and 51c of the cameras 1b and 1c, the same obstacle is often detected from the captured images of the cameras 1a to 1c. Whether the obstacles are the same can be determined by, for example, whether the distances from the vehicle are the same. In this case, the direction may be determined on the assumption that the obstacle is detected from the captured image in which the obstacle is larger in size. It is thereby possible to provide warning information that facilitates grasping the direction in which the obstacle is located.

Next, the information output section 34 determines a degree of risk on the basis of the detection results about the obstacle (Step S6). The information output section 34 can determine the degree of risk on the basis of at least one of the detection result about the traffic lanes and the driving information about the vehicle acquired from the driving information output section 7 together with the detection results about the obstacle. Determination accuracy for the degree of risk improves by a combination of the detection results about the obstacle with the detection result about the traffic lanes or the driving information. The degree of risk may be either a binary index value representing whether risk is high or low, or a multi-index value representing a level of risk in a plurality of levels.

Figure 5:
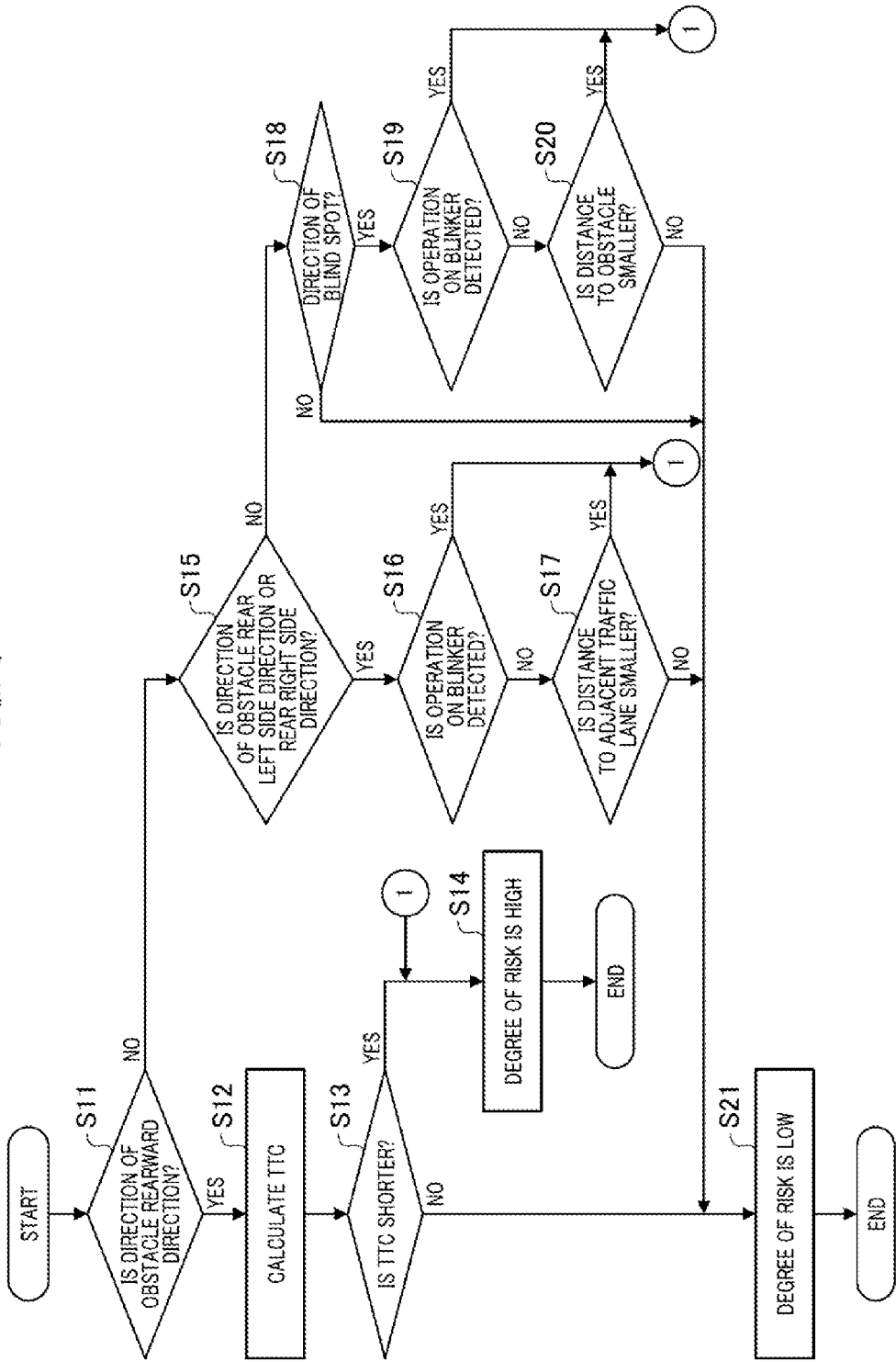
FIG. 5 is a flowchart of processing for determining a degree of risk.

FIG. 5 is a flowchart illustrating procedures for processing for determining the degree of risk. This processing for determining the degree of risk is executed per detected obstacle.

As illustrated in FIG. 5, when the direction in which the detected obstacle is located is a rearward direction (Step S11: YES), the information output section 34 calculates a time until the vehicle collides with the obstacle (Time-To-Collision (TTC)) (Step S12). The information output section 34 can calculate the TTC from the information related to the obstacle and obtained by analyzing the captured images or the measurement result of the millimeter-wave radar 6b. Examples of the information include a position of the obstacle, the distance between the vehicle and the obstacle, and the relative speed of the obstacle with respect to the vehicle. The information output section 34 may calculate the TTC by further combining the traveling speed of the vehicle obtained from the vehicle speed sensor 7a.

When the calculated TTC is shorter than a threshold (Step S13: YES), the information output section 34 determines that there is a possibility of a collision with the obstacle located in rear of the vehicle, that is, a rear-end collision, and that the degree of risk is high (Step S14). The information output section 34 can also determine the degree of risk at a plurality of levels in such a manner that the degree of risk is higher in level as the TTC is shorter by comparing the TTC with a plurality of thresholds.

When the TTC is not shorter than the threshold (Step S13: NO), the information output section 34 determines that the degree of risk of the rear-end collision is low (Step S21).

On the other hand, when the direction in which the obstacle is located is a rear left side direction or a rear right side direction (Steps S11: NO and S15: YES), the information output section 34 determines whether the blinker sensor 7b detects the operation on the left or right blinker in the direction in which the obstacle is located (Step S16). When the blinker sensor 7b detects the operation on the corresponding blinker (step S16: YES), the information output section 34 determines that there is a possibility of a collision with the obstacle travelling in a traffic lane in a direction in which the vehicle is about to make a traffic lane change and located on the rear side of the vehicle, and that the degree of risk is high (Step S14). At this time, the information output section 34 may determine the degree of risk at a plurality of levels in such a manner that the degree of risk is higher in level as the distance between the vehicle and the obstacle is smaller by comparing the distance with a plurality of thresholds.

When the blinker sensor 7b does not detect the operation on the left or right blinker (Step S16: NO), the information output section 34 determines whether a distance between the vehicle and the traffic lane adjacent to the vehicle among the traffic lanes detected by the third detection section 33 is smaller than a threshold (Step S17). When the distance is smaller than the threshold (Step S17: YES), the information output section 34 determines that there is a possibility that the vehicle deviates from the traffic lane in which the vehicle is traveling and enters the adjacent traffic lane in which the obstacle is located on the rear side, and that the degree of risk is high (Step S14). The information output section 34 may determine the degree of risk at a plurality of levels in such a manner that the degree of risk is higher in level as the distance between the vehicle and the traffic lane is smaller by comparing the distance with a plurality of thresholds.

When the blinker sensor 7b does not detect the operation on the left or right blinker and the distance between the vehicle and the adjacent traffic lane is not smaller than the threshold (Steps S16: NO and S17: NO), the information output section 34 determines that the degree of risk of the traffic lane change or a traffic lane deviation is low (Step S21).

When the direction in which the obstacle is located is a direction of the blind spot from the left side to the rear left side (Steps S11: NO, S15: NO, and S18: YES), the information output section 34 determines whether the blinker sensor 7b detects the operation on the left blinker (Step S19). When the blinker sensor 7b detects the operation on the left blinker (Step S19: YES), the information output section 34 determines that there is a possibility of a collision with the obstacle when the vehicle turns left and that the degree of risk is high (Step S14). At this time, the information output section 34 may determine the degree of risk at a plurality of levels in such a manner that the degree of risk is higher in level as the distance between the vehicle and the obstacle is smaller by comparing the distance with a plurality of thresholds. Furthermore, the information output section 34 may determine that the degree of risk is high not only when the distance is smaller but also when the traveling speed detected by the vehicle speed sensor 7a is higher than a threshold.

When the blinker sensor 7b does not detect the operation on the left or right blinker (Step S19: NO), the information output section 34 determines whether the distance between the vehicle and the obstacle obtained by analyzing the captured image or the measurement result of the ultrasonic sonar 6a is smaller than a threshold (Step S20). When the distance to the obstacle is not smaller than the threshold (Step S20: NO), the information output section 34 determines that the degree of risk of a collision of the vehicle when turning left is low (Step S21).

When the distance to the obstacle is smaller than the threshold (Step S20: YES), the information output section 34 determines that there is a possibility of a collision with the obstacle located in the blind spot and that the degree of risk is high (Step S14). At this time, the information output section 34 may determine the degree of risk at a plurality of levels in such a manner that the degree of risk is higher in level as the distance between the vehicle and the obstacle is smaller by comparing the distance with a plurality of thresholds. Furthermore, the information output section 34 may determine that the degree of risk is high not only when the distance is smaller but also when the traveling speed detected by the vehicle speed sensor 7a is higher than a threshold.

After determining the degree of risk, the information output section 34 determines whether the determined degree of risk exceeds a threshold as illustrated in FIG. 3 (Step S7). When the degree of risk is high and exceeds the threshold (Step S7: YES), the information output section 34 generates warning information indicating the direction in which the obstacle is located, and outputs the warning information to the display section 4 or the audio output section 5 (Step S8). When the degree of risk does not exceed the threshold (Step S7: NO), the information output section 34 ends the present processing without generating the warning information.

Examples of the warning information include an arrow pointing to the direction in which the obstacle is located, a marker blinking in the direction, and a message sentence notifying the driver of the direction when the warning information is output by the display section 4. Examples of the warning information include a voice message notifying the driver of the direction, a notification sound unique to each direction, and a melody sound when the warning information is output by the audio output section 5. The warning information can contain not only the direction in which the obstacle is located but also information related to the obstacle such as the classification (vehicle, person, or the like) of the obstacle, the relative speed of the obstacle with respect to the vehicle, the TTC, and a separation distance.

The information output section 34 can determine an output mode of the warning information depending on the degree of risk. Setting the output mode in such a manner that a degree of emphasis of the obstacle is higher as the degree of risk is higher can facilitate driver's grasping the presence and the direction of the obstacle. In a case where the warning information is output by the display section 4, for example, a size, a color, a brightness, presence or absence of blinking, and the like of characters or images to be displayed as the warning information can be varied depending on the degree of risk. Furthermore, in a case where the warning information is output by the audio output section 5, for example, a pitch of the sound, a tone, a type of the melody sound, a content of the voice message, and the like can be varied depending on the degree of risk.

Moreover, the information output section 34 can generate one display image in which the captured images in the directions are arranged and output the display image to the display section 4. The information output section 34 can output the warning information to the display section 4 to be superimposed on the captured image in each direction of the display image. The warning information indicates the direction in which the obstacle is determined to be located. The one display image can facilitate driver's grasping situations in the directions on the rear side and particularly the direction in which the obstacle is located among the directions. Since the display section 4 can confirm the situations on the rear side, the driver can concentrate a driver's line of sight on a front side, and safety on the front side can be enhanced.

Figure 6A:
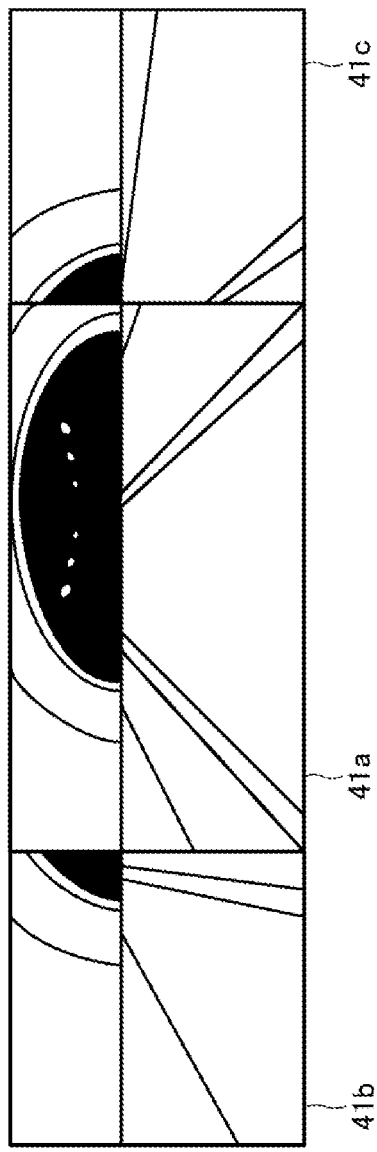
FIG. 6A is a view illustrating an example of a display screen in a case where warning information is not output.

FIG. 6A illustrates an example of a display screen in a case where the warning information is not output, and FIG. 6B illustrates an example of a display screen in a case where warning information is output. In the examples of the display screen of FIGS. 6A and 6B, a captured image 41*b* of the rear left side, a captured image 41*a* of the rear, and a captured image 41*c* of the rear right side are arranged in this order and displayed as one display image.

In the example of the display screen illustrated in FIG. 6A, the warning information is not displayed since no obstacle is detected or an obstacle is detected but the degree of risk is low. On the other hand, in the example of the display screen illustrated in FIG. 6B, an obstacle D2 is detected in the captured image 41*c* of the right rear side. The obstacle D2 travels in the traffic lane adjacent to a right side of the traffic lane in which the vehicle is traveling, and the TTC of which is smaller than the threshold. An image 401 of a frame is, therefore, displayed as the warning information. The image 401 of the frame is superimposed on an outer edge of the captured image 41*c* of the rear right side where the obstacle D2 is located. A color of the image 401 of the frame is switched over to blue, yellow, and red in order as a distance to the obstacle D2 is smaller and the degree of risk is higher in level.

Furthermore, in the example of the display screen illustrated in FIG. 6B, the operation on the blinker is not detected. However, an image 402 of a blinking line is displayed to be superimposed on a white line of the right traffic lane as the warning information since it is determined that the distance between the right traffic lane in which the obstacle D2 is located and the vehicle is small and the degree of risk is high. The image 402 of the line can draw driver's attention to the right traffic lane. The white line of the right traffic lane is detected from both the captured images 41*a* and 41*c*. However, the image 402 of the line is displayed in the captured image 41*a* larger in a size of the white line, so that the image 402 can draw the driver's attention more easily. It is noted that an image of a line covering the traffic lane per se may be superimposed on the traffic lane as the warning information as an alternative to the white line. To facilitate calling attention, it is preferable to superimpose the image of the line on the captured image 41*c* larger in the size of the traffic lane.

Figure 7:
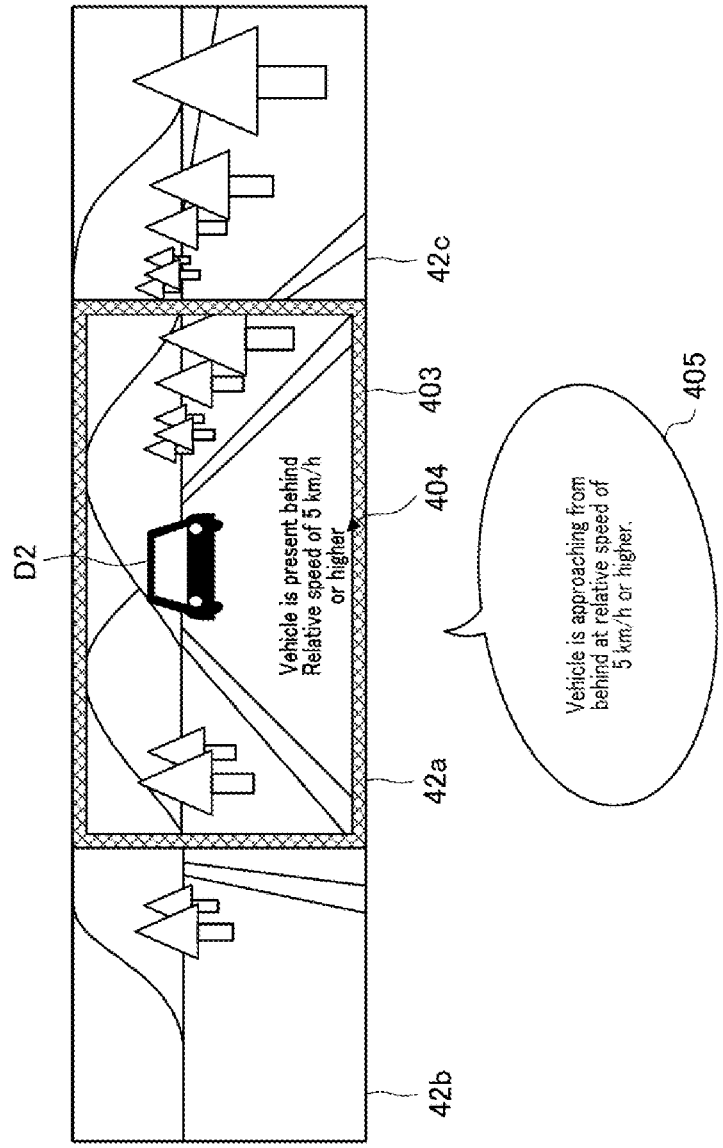
FIG. 7 is a screen view illustrating another example of the display screen in the case where warning information is output.

FIG. 7 illustrates another example of the display screen in the case where the warning information is output. In the example of the display screen illustrated in FIG. 7, a captured image 42*b* of the rear left side, a captured image 42*a* of the rear, and a captured image 42*c* of the rear right side are arranged in this order and displayed as one display image.

In the example of the screen illustrated in FIG. 7, the obstacle D2 having the TTC smaller than the threshold is detected in the captured image 42*a* of the rear. An image 403 of a frame is, therefore, superimposed on an outer edge of the captured image 42*a* as one piece of the warning information. Furthermore, as one piece of the warning information, a message sentence 404 is displayed. The message sentence 404 warns the driver that the obstacle D2 is another vehicle, which is located in rear of the subject vehicle, and the relative speed of the obstacle D2 is 5 km/h or higher. In parallel with the display, the audio output section 5 also outputs an audio 405 warning the driver that the vehicle as the obstacle D2 is approaching at the relative speed of 5 km/h or higher.

As described so far, the driving assistance system 100 according to the present embodiment detects the obstacle located in rear side of the vehicle on the basis of not only the plurality of captured images of the rear of the vehicle but also the measurement result using the measurement wave. It is possible to detect and warn of not only an obstacle at a short detection distance but also an obstacle at a long detection distance. Furthermore, according to the present embodiment, the direction in which the obstacle is located is determined on the basis of the detection results, and the warning information indicating the direction in which the obstacle is located is output. It is thereby possible to provide the warning information that facilitates driver's grasping the direction in which the obstacle is located in the rear of the vehicle difficult for the driver to visually recognize during driving, and to avoid a collision with the obstacle and assist safety driving.

The embodiment described above is an appropriate example of the present invention, and the present invention is not limited to the embodiment. Modifications can be made as appropriate without departing from the gist of the present invention.

For example, the display section 4 is not necessarily one monitor and may be three monitors corresponding to the cameras 1*a* to 1*c*, respectively. It is possible to perform display as illustrated in FIGS. 6A, 6B, and 7 by arranging the monitors adjacently to allow the monitors to display the captured images of the cameras 1*a* to 1*c*, respectively. In this case, the warning information may be output to the monitor displaying the captured image in which the obstacle is detected since the three monitors correspond to the rear left side, the rear side, and the rear right side of the vehicle, respectively. The driver can grasp a state of the rear side at a glance by the arranged monitors, and can easily grasp in which direction the obstacle is located by the monitor to which the warning information is output.

The present application claims priority based on Japanese Patent Application No. 2019-102550 filed on May 31, 2019, the entire contents of which are incorporated herein.

REFERENCE SIGNS LIST

100 Driving assistance system
1*a* to 1*c* Camera
3 ECU
31 First detection section
32 Second detection section
33 Third detection section
34 Information output section
35 Storage section
4 Display section
5 Audio output section
6*a* Ultrasonic sonar
6*b* Millimeter-wave radar
7*a* Vehicle speed sensor
7*b* Blinker sensor

The invention claimed is:

1. A driving assistance system, comprising:
   a processor; and
   a memory including a program that, when executed by the processor, causes the processor to perform operations, the operations including:
   first detecting an obstacle by analyzing a plurality of captured images of a rear side of a vehicle, the plurality of captured images being generated by a plurality of cameras, the obstacle being outside the vehicle;

second detecting the obstacle by analyzing a reflected wave of a measurement wave transmitted to the obstacle by the vehicle, the measurement wave being one of a sound wave or a radio wave;

determining a direction in which the obstacle is located with respect to the vehicle based on first detection results of the first detecting and the second detecting;

third detecting traffic lanes around the vehicle by analyzing the plurality of captured images;

determining a degree of risk of the obstacle based on the first detection results and second detection results of the third detecting; and generating and outputting warning information indicating the direction when the degree of risk exceeds a threshold.

2. The driving assistance system according to claim 1, wherein the processor acquires driving information about the vehicle, and determines the degree of risk further based on the driving information.

3. The driving assistance system according to claim 1, wherein the processor determines an output mode of the warning information depending on the degree of risk.

4. The driving assistance system according to claim 1, wherein the plurality of captured images contain captured images in a plurality of directions of the rear side, and the processor generates one display image by arranging the plurality of captured images in each of the plurality of directions, superimposes the warning information indicating the direction in which the obstacle is located on the plurality of captured images in each of the plurality of directions, and outputs the one display image to a display of the vehicle.

5. A driving assistance method executed by a driving assistance system, the driving assistance method comprising:

first detecting, by a processor, an obstacle by analyzing a plurality of captured images of a rear side of a vehicle, the plurality of captured images being generated by a plurality of cameras, the obstacle being outside the vehicle;

second detecting, by the processor, the obstacle by analyzing a reflected wave of a measurement wave transmitted to the obstacle by the vehicle, the measurement wave being one of a sound wave or a radio wave;

determining, by the processor, a direction in which the obstacle is located with respect to the vehicle based on first detection results of the first detecting and the second detecting;

third detecting, by the processor, traffic lanes around the vehicle by analyzing the plurality of captured images;

determining, by the processor, a degree of risk of the obstacle based on the first detection results and second detection results of the third detecting; and generating and outputting warning information indicating the direction when the degree of risk exceeds a threshold.

6. A non-transitory computer-readable medium storing a program for causing a computer to execute:

first detecting an obstacle by analyzing a plurality of captured images of a rear side of a vehicle, the plurality of captured images being generated by a plurality of cameras, the obstacle being outside the vehicle;

second detecting the obstacle by analyzing a reflected wave of a measurement wave transmitted to the obstacle by the vehicle, the measurement wave being one of a sound wave or a radio wave;

determining a direction in which the obstacle is located with respect to the vehicle based on first detection results of the first detecting and the second detecting;

third detecting traffic lanes around the vehicle by analyzing the plurality of captured images;

determining a degree of risk of the obstacle based on the first detection results and second detection results of the third detecting; and generating and outputting warning information indicating the direction when the degree of risk exceeds a threshold.

* * * * *